United States Patent [19]

Wilson

[11] Patent Number: 4,782,698
[45] Date of Patent: Nov. 8, 1988

[54] METHOD AND APPARATUS FOR MEASURING OIL LEVEL

[75] Inventor: Thomas H. Wilson, Indianapolis, Ind.

[73] Assignee: General Motors Corporation, Detroit, Mich.

[21] Appl. No.: 947,297

[22] Filed: Dec. 29, 1986

[51] Int. Cl.$^4$ .................. G01F 23/22; G01R 27/26
[52] U.S. Cl. .................. 73/304 C; 364/509; 374/142
[58] Field of Search .................. 73/304 C; 364/509; 374/144

[56] References Cited

U.S. PATENT DOCUMENTS

| | | | |
|---|---|---|---|
| Re. 23,493 | 5/1952 | Edelman | 73/304 C |
| 2,962,641 | 11/1960 | Maltby et al. | 73/304 C X |
| 3,170,327 | 2/1965 | Powell | 374/144 X |
| 3,283,577 | 11/1966 | Schuck | 73/304 C |
| 3,376,746 | 4/1968 | Roberts | 73/304 C |
| 3,918,306 | 11/1975 | Maltby | 73/304 C |
| 4,149,231 | 4/1979 | Bukosky et al. | 73/304 C X |
| 4,296,630 | 10/1981 | Jung et al. | 73/304 C |
| 4,337,638 | 7/1982 | Leonard et al. | 73/1 R |
| 4,373,390 | 2/1983 | Van Dyke et al. | 73/304 C |
| 4,589,077 | 5/1986 | Pope | 364/509 |
| 4,591,946 | 5/1986 | Pope | 73/304 C |
| 4,594,893 | 6/1986 | Lombard et al. | 73/304 C |
| 4,601,201 | 7/1986 | Oota et al. | 364/509 X |
| 4,686,857 | 8/1987 | Kato | 73/304 C |

Primary Examiner—Daniel M. Yasich
Attorney, Agent, or Firm—Warren D. Hill

[57] ABSTRACT

A single capacitor is used to measure the oil level in an engine or transmission and compensate the sensed capacitance for changes in dielectric constant. Measurements are made for two different running conditions, one giving a capacitance reading dependent only on dielectric constant and one giving a capacitance dependent on oil level as well as dielectric constant. The transmission application uses a capacitor that is fully immersed in oil when the engine is off and partly immersed when the engine is idling, so that both types of measurements can be obtained. The engine application uses a capacitor having an upper section spaced from a lower section. Only the lower section is immersed during engine idle to render dielectric constant information, while the upper section is partly immersed when the engine is off.

9 Claims, 3 Drawing Sheets

METHOD AND APPARATUS FOR MEASURING OIL LEVEL

FIELD OF THE INVENTION

This invention relates to method and apparatus for measuring the oil or fluid level in an automotive engine or transmission.

BACKGROUND OF THE INVENTION

The proper maintenance of an automobile or truck requires that the fluid levels be maintained at or above a prescribed level. Conventionally, an ullage rod or dipstick is used to measure the fluid level preferably at periodic intervals or realistically whenever the operator remembers to perform this function. It has been previously proposed to automate the measurement functions by electrically sensing the levels each time the vehicle is used. In particular, as shown in the U.S. Pat. Nos. 3,918,306, 4,373,389 and 4,594,893, it is known to use elongated capacitors in the oil reservoir and extending over the expected range of oil level. The capacitance will vary according to the oil level to provide a measure of oil level but is also dependent on the dielectric constant of the oil. It is important to compensate for variations in the dielectric constant since it can vary considerably with different brands of oil and the usage of the oil. Compensation has been provided heretofore by employing a second capacitor which is always submersed in the oil and coupled in circuit with the level sensing capacitor in a way to compensate for any change of dielectric constant.

It is desired to use the compensated capacitance scheme to obtain the advantages thereof but to avoid the cost penalty of a second capacitor.

SUMMARY OF THE INVENTION

It is therefore an object of this invention to provide a method and apparatus for measuring automotive oil level using only a single capacitor. It is a further object to attain the main object in either an engine or a transmission.

The invention is carried out by means for measuring oil level in an automotive vehicle subject to change of level according to engine running conditions, comprising an oil reservoir, a single capacitor in the reservoir positioned for immersion to a predictable amount during a reference measuring period and for immersion to a variable level during a level measuring period, and means controlled by engine running conditions for measuring the capacitances during the reference and level measuring periods and for comparing the two capacitances to determine whether the oil level is sufficient.

The invention is also carried out by the method of measuring oil level in a reservoir of an automotive vehicle wherein the oil level is subject to vehicle engine operation, comprising the steps of; measuring the capacitance of a capacitor while it is immersed in oil to predetermined extent during one engine condition thereby establishing a reference capacitance, measuring the capacitance of the same capacitor while it is partially immersed in oil to an unknown extent during another engine condition thereby establishing an uncompensated level capacitance, storing at least one of the measured capacitances for comparison to the other capacitance, and determining the ratio of the capacitances to obtain a value of oil level independently of the oil dielectric constant.

BRIEF DESCRIPTION OF THE DRAWINGS

The above and other advantages of the invention will become more apparent from the following description taken in conjunction with the accompanying drawings wherein like reference numerals refer to like parts and wherein.

DESCRIPTION OF THE PREFERRED EMBODIMENT

In general the invention operates on the basis that the oil level in an engine or transmission changes predictably for different engine operating conditions and there is a condition when a capacitive level measurement (though uncompensated) can be made and a different condition when a reference capacitive measurement can be made for compensation purposes.

Figure 1:
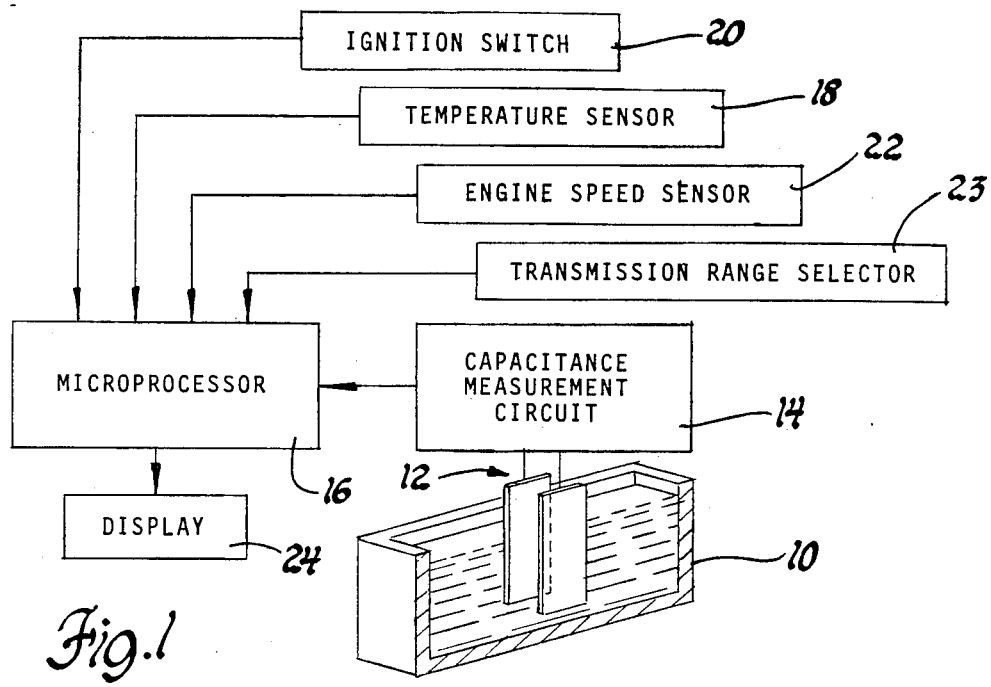
FIG. 1 is a schematic diagram of a transmission oil level sensor according to the invention.

In FIG. 1 the oil sump or reservoir 10 of an automotive transmission contains oil having a level to be measured. An elongated capacitor 12 comprising a pair of parallel plates is mounted vertically in the sump to extend across the range of levels to be detected. A capacitance measuring circuit 14 is connected to the capacitor 12 for energizing the capacitor with AC voltage and determining its capacitance. The circuit 14 has a capacitance data output connected to a microprocessor 16, which may be the microprocessor used for engine control. Other inputs to the microprocessor are supplied from a transmission or transmission oil temperature sensor 18, the vehicle ignition switch 20 or ignition circuit, an engine speed sensor 22, and the transmission range selector 23.

The transmission oil level is measured in "NEUTRAL" or "PARK" with the engine running at idle speed after the engine has been operating for several seconds or perhaps a minute to insure that the various cavities of the transmission are filled and the sump contains only reserve oil. For the same reason, it is well to make the measurement when the transmission is at some minimum temperature, say, 30° or 40° F., and the oil is able to flow well. In conventional measurement it is necessary to make the test when the transmission is at its full operating temperature because the thermal expansion and contraction of the oil will change the measured level to give an incorrect reading. The microprocessor, however can be programmed with a conversion table to adjust the measured level according to temperature.

Figure 2:
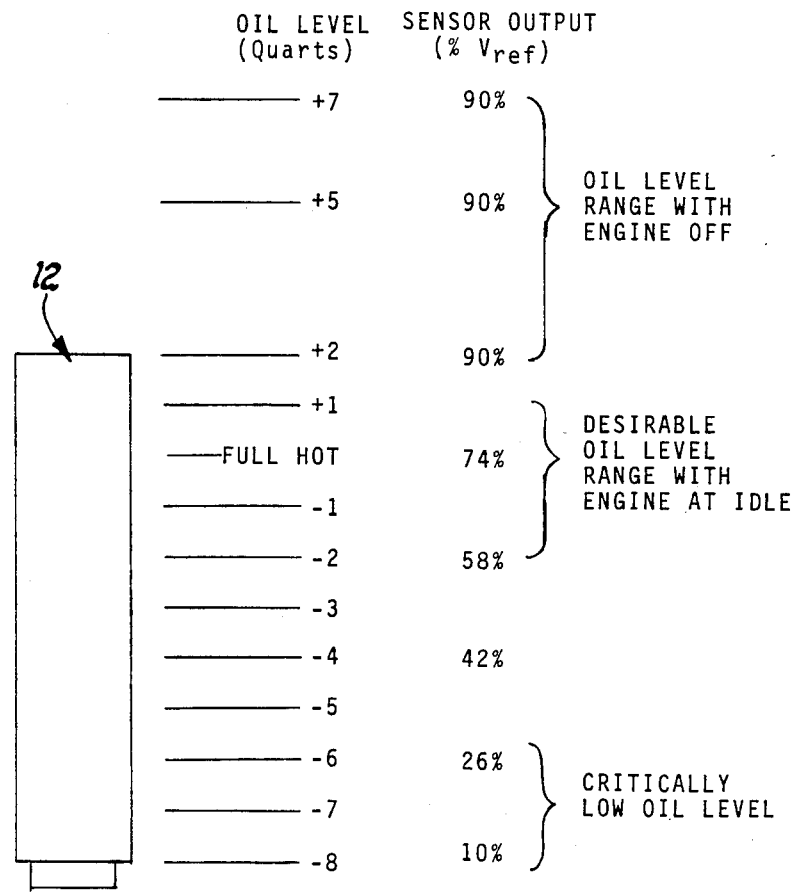
FIG. 2 is a view of the capacitor of the sensor of FIG. 1 related to oil level and sensor output.

FIG. 2 shows the capacitor 12 with oil level reference marks indicating a preferred "FULL HOT" level when the sump contains eight quarts of oil. The measurable oil level ranges from two quarts above to eight quarts below the "FULL HOT" level while six quarts low is deemed to be a critically low oil level. The acceptable oil level range is one quart above to two quarts below the "FULL HOT" level. When the engine is off and the oil has drained to the sump, the oil level will be above the top of the capacitor 12. At the "FULL HOT" level, for this specific example, the sensor circuit 14 produces an output which is 74% of a reference voltage, $V_r$. The top of the sensor is at the two quarts over-full level and the output will be 90% of reference voltage, $V_r$, at that or higher levels. At that level, the capacitance of the fully immersed capacitor 12 is measured to produce a reference capacitance value which is an effective measure of the oil dielectric constant. In this example it is 90% of $V_r$. When measurements are made with the engine at idle to get oil level information, the signal can be normalized by comparing it to 90% of $V_r$ to arrive at a value of oil level which is independent of the dielectric constant. In another example using a different oil, if the reference capacitance value were 83%, that would be the normalizing factor for the measured level capacitance.

Figure 3:
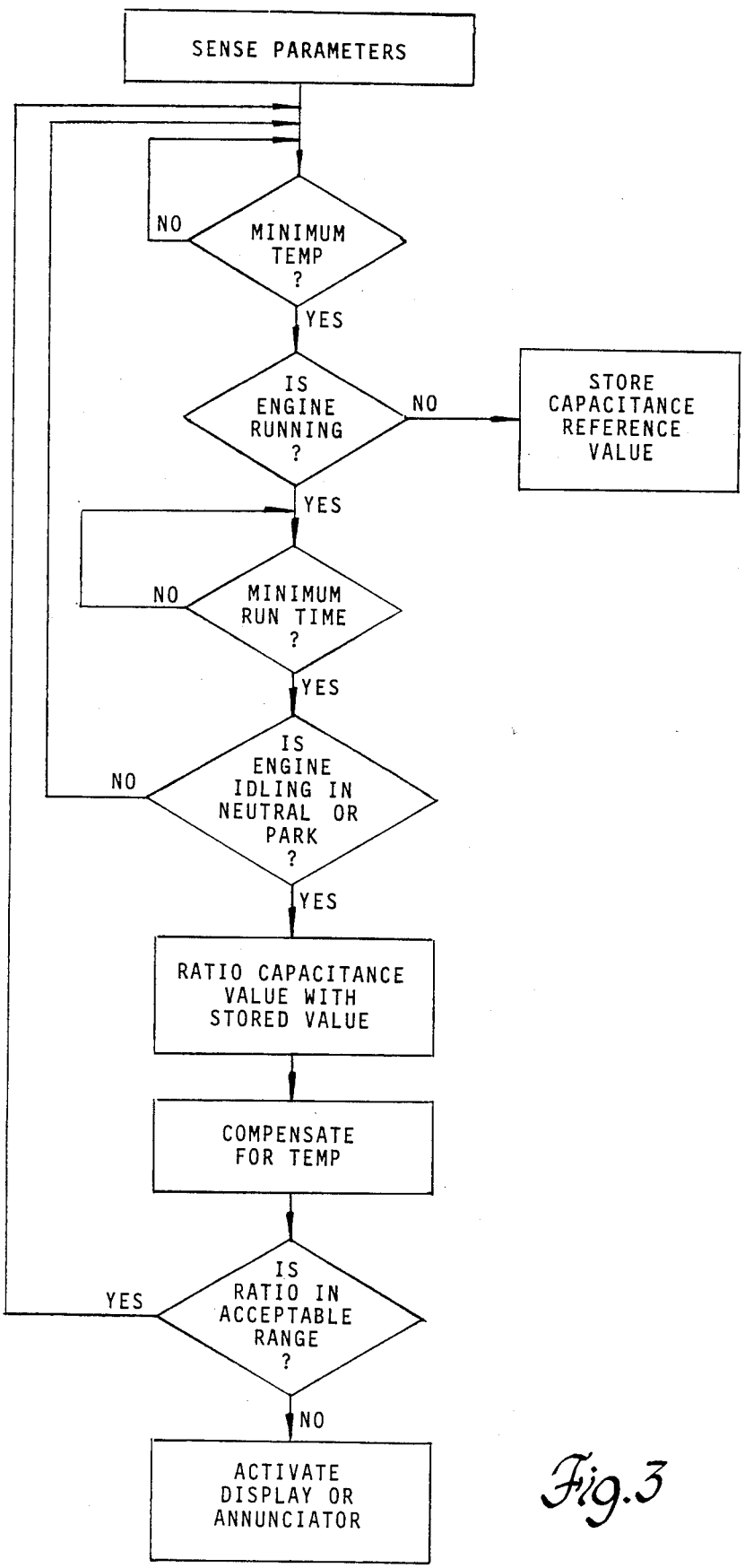
FIG. 3 is a flow chart of the operating program of the microprocessor of FIG. 1.

The flow chart of FIG. 3 completes the description of the system operation and the microprocessor operation in particular. First the capacitance, the transmission temperature, the transmission range, the engine speed, and the ignition switch closing are sensed. Then it is determined whether the temperature satisfies a minimum requirement, say, 40° F. If so, and the engine is not running, as determined by the engine speed, the capacitance or some capacitance related signal, such as the output of the circuit 14, is stored as the reference value. If the engine is running, a test is made for a minimum running time of several seconds to insure that the transmission cavities are filled. If then, the engine is idling and the transmission is in PARK or NEUTRAL, the capacitance is compared with the stored capacitance value to determine the ratio. The ratio is compensated for the effects of thermal expansion of the oil by a conversion table stored in the microprocessor. The compensated ratio is the correct measure of transmission oil level. If it is in an acceptable range no action is taken but if it is out of range a signal is sent to the display 24 or to an annunciator to warn the operator of the condition. If desired a further test may be included for detecting critically low oil level and vehicle operating restraints may be applied if that condition occurs.

Figure 4:
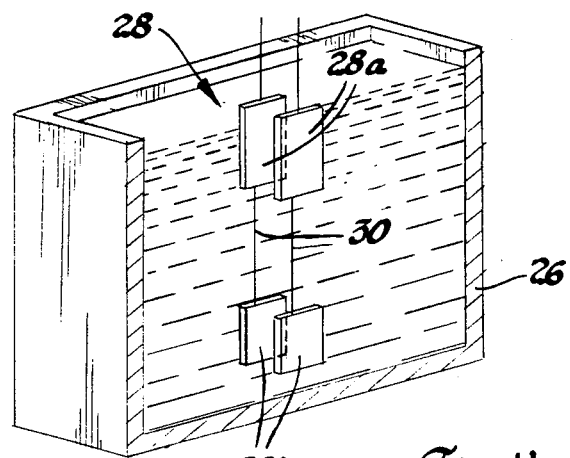
FIG. 4 is a schematic diagram of an engine oil level sensor according to the invention.
Figure 5:
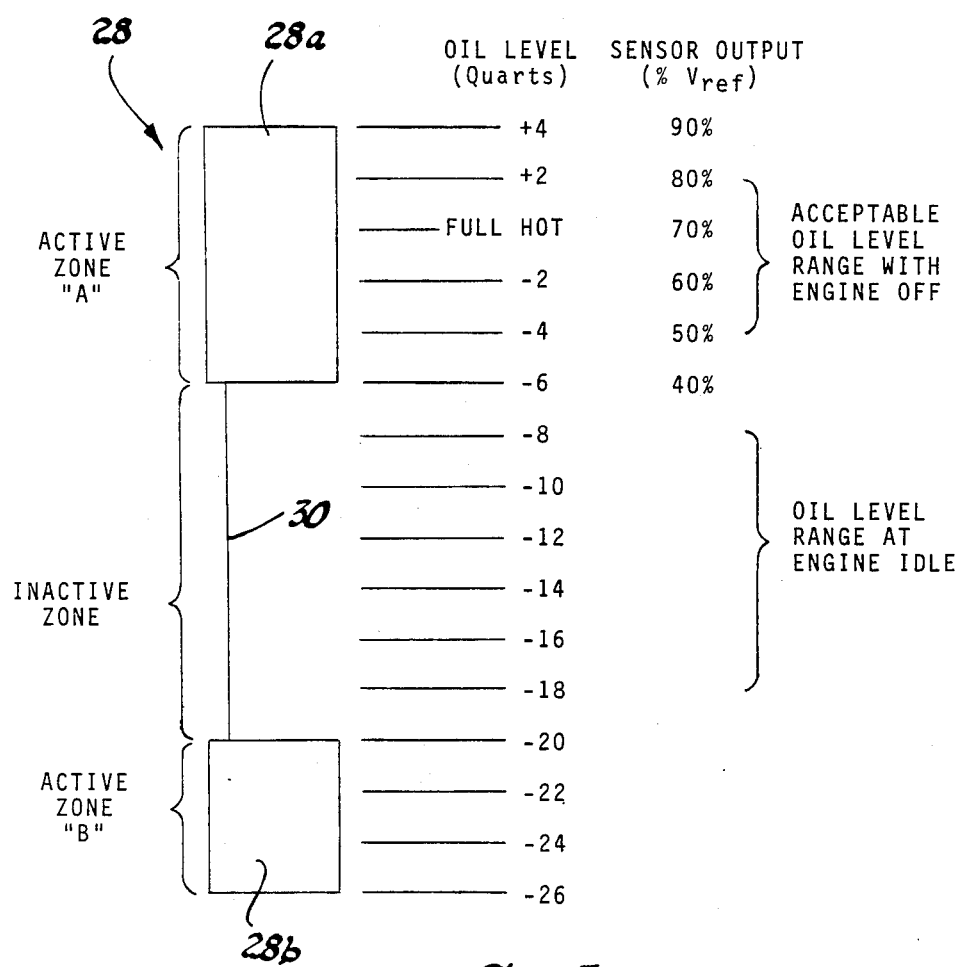
FIG. 5 is a view of the capacitor of the sensor of FIG. 4 related to oil level and sensor output.

The oil level sensor as applied to automotive engines is shown, in part, in FIGS. 4 and 5. The engine sump 26 contains a capacitor 28 which has two vertically separated sections 28a and 28b. The remainder of the system is substantially the same as that of FIG. 1 except that the temperature sensor 18 measures engine or engine oil temperature and the transmission range selector 23 is not required. The capacitor 28 is a single capacitor having two spaced plates, at least one of the plates having two sections connected by a conductor 30. The upper section 28a, defining "active zone A", extends across the range of measurable oil level with the engine off. In the example illustrated in FIG. 5, which is adapted to an engine with a large oil capacity, the measurable range is from six quarts below "FULL HOT" level to four quarts above "FULL HOT" level. In this range the sensor output varies from 40% to 90% of $V_r$. The lower section 28b, defining "active zone B", is spaced from the upper section to define an "inactive zone" between the two sections. The lower section 28b extends from 20 to 26 quarts below "FULL HOT" and provides a sensor output of 10% to 40% $V_r$. During idling the oil level will be in the range between the capacitor sections and the lower section 28b will always be immersed in oil. The capacitance obtained with the engine idling thus can be used as the reference capacitance which varies according to the dielectric constant. The ratio of the capacitance with the engine off to the capacitance with the engine idling gives the value representing oil level independently of the dielectric constant. If desired the thermal expansion correction may be made as well.

The operation of the engine sensor is essentially the same as the transmission sensor described above and the flow chart of FIG. 3 generally applies except that the level value is obtained with the engine off, the reference value is obtained with the engine idling, and the comparison step is modified accordingly. Either value may be obtained first and stored for later comparison with the other value.

In either application a moving average of the most recent reference readings may be calculated and used as the reference value in order to minimize the impact of any erroneous readings.

It will thus be seen that the invention provides an accurate measure of engine or transmission oil level using only one capacitor and, as compared with sensors using two or more capacitors with attendant circuitry, has fewer parts, lower cost and higher reliability.

I claim:

1. Means for measuring oil level in an automotive vehicle subject to change of oil level according to engine running conditions, comprising an oil reservoir containing oil the level of which is to be measured, a single capacitor in the reservoir positioned for immersion in said oil to a predictable amount during a reference measuring period and for immersion in said oil to a variable level during a level measuring period, and means controlled by engine running conditions for measuring the capacitances of said capacitor respectively during the reference and level measuring periods and for comparing the two capacitances to determine the level of oil in said reservoir.

2. Means for measuring oil level in an automotive vehicle subject to change of oil level according to engine running conditions, comprising an oil reservoir containing oil the level of which is to be measured, a single capacitor in the reservoir positioned for immersion in said oil to a predictable amount during a reference measuring period and for immersion in said oil to a variable level during a level measuring period, means for enabling said reference measuring period and said level measuring period in a predetermined sequence in response to running conditions of said engine, means for measuring the capacitance of said capacitor during each of said measuring periods, means effective during one of the measuring periods for storing the measured capacitance, and means effective during the other of the measuring periods for comparing the stored capacitance and the current capacitance, whereby the effective oil level is determined independently of changes in the oil dielectric constant.

3. Means for measuring oil level in an automotive engine comprising, a reservoir containing oil the level of which is to be measured, a single capacitor having a pair of opposed plates divided into two spaced sections, a lower section positioned for total immersion in the oil when the engine is idling and an upper section positioned in the range of oil level to be measured only when the engine is off, means for measuring the level capacitance of said capacitor when the engine is off and the reference capacitance of said capacitor when the engine is idling, and means for determining the ratio of the level capacitance to the reference capacitance to yield a compensated level capacitance whereby the effective oil level is determined independently of changes in the oil dielectric constant.

4. Means for measuring oil level in an automotive transmission comprising, a transmission driven by an engine, the transmission having a reservoir that contains oil and which is filled with oil when the engine is off and partially filled with oil when the engine is idling, a capacitor in the reservoir for complete immersion in said oil when the engine is off and for spanning the range of oil level to be measured when the engine is idling, means for measuring the level capacitance of said capacitor when the engine is idling and the reference capacitance of said capacitor when the engine is off, and means for determining the ratio of the level capacitance to the reference capacitance to yield a compensated level capacitance whereby the effective oil level is determined independently of changes in the oil dielectric constant.

5. The method of measuring oil level in a reservoir of an automotive vehicle wherein the reservoir contains oil and wherein the oil level is subject to vehicle engine operation, comprising the steps of; measuring the capacitance of a capacitor while it is immersed in oil to a predetermined extent during one engine condition, thereby establishing a reference capacitance, measuring the capacitance of the same capacitor while it is partially immersed in oil to an unknown extent during another engine condition, thereby establishing an uncompensated level capacitance, storing at least one of the measured capacitances for comparison to the other capacitance, and determining the ratio of the capacitances to obtain a value of oil level independently of the oil dielectric constant.

6. The method of measuring oil level in a reservoir of an automotive vehicle engine wherein the reservoir contains oil and wherein the oil level is subject to vehicle engine operation, comprising the steps of; measuring the capacitance of a capacitor while it is partially immersed in oil to an extent dependent on oil level when the engine is off, thereby establishing a level capacitance, measuring the capacitance of the same capacitor during engine idling while it is immersed in oil to a predetermined extent, storing at least one of the measured capacitances, determining the ratio of the capacitances to obtain a value of oil level independently of the oil dielectric constant, and producing an output signal bearing oil level information.

7. The method of measuring oil level as defined in claim 6 including the steps of measuring the oil temperature and compensating the oil level value for temperature.

8. The method of measuring oil level in a reservoir of an automotive vehicle transmission wherein the reservoir contains oil and wherein the oil level is subject to vehicle engine operation, comprising the steps of; measuring the capacitance of a capacitor when the engine is idling and the capacitor is partially immersed in oil to an unknown extent dependent on oil level, thereby establishing a level capacitance, measuring the capacitance of the same capacitor when the engine is off and the capacitor is immersed in oil to a predetermined extent, storing at least one of the measured capacitances, determining the ratio of the capacitances to obtain a value of oil level independently of the oil dielectric constant, and producing an output signal bearing oil level information.

9. The method of measuring oil level as defined in claim 8 including the steps of measuring the oil temperature and compensating the oil level value for temperature.

* * * * *